Dec. 3, 1968 G. KOHN 3,414,891

NONDESTRUCTIVE READOUT THIN FILM MEMORY

Filed Dec. 30, 1964 2 Sheets-Sheet 1

INVENTOR.
GERHARD KOHN

BY Stephen J. Limanek

ATTORNEY

NONDESTRUCTIVE READOUT THIN FILM MEMORY

Filed Dec. 30, 1964 2 Sheets-Sheet 2

United States Patent Office 3,414,891

Patented Dec. 3, 1968

3,414,891

NONDESTRUCTIVE READOUT THIN FILM MEMORY

Gerhard Kohn, Thalwil, Zurich, Switzerland, assignor to International Business Machines Corporation, Armonk, N.Y., a corporation of New York Filed Dec. 30, 1964, Ser. No. 422,289
12 Claims. (Cl. 340—174)

Figure 1:
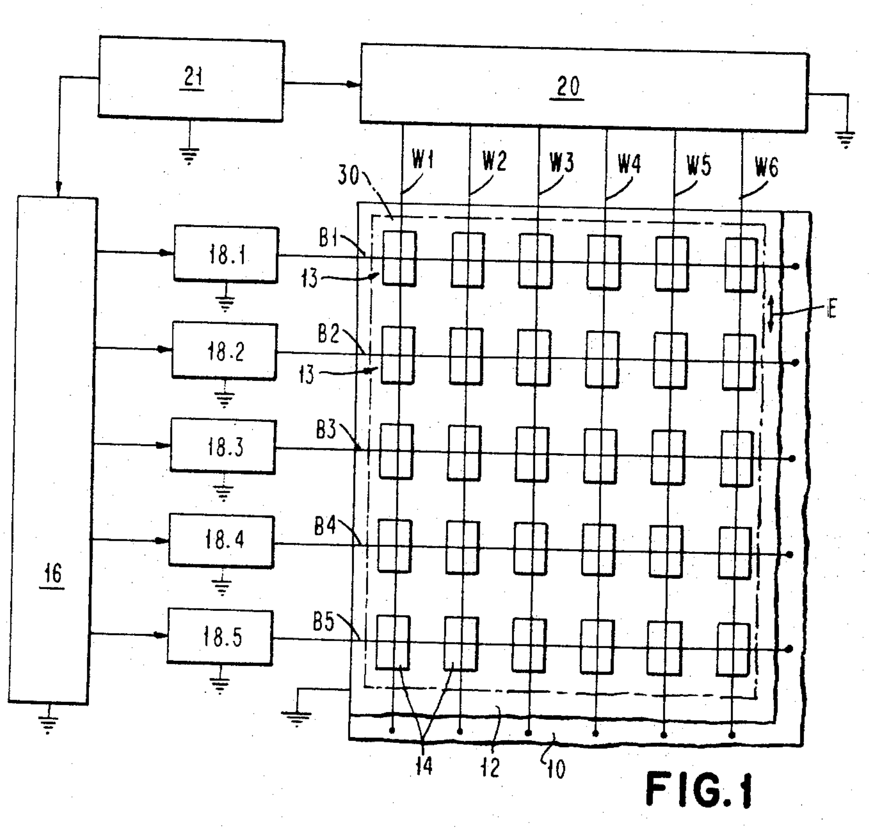

This invention relates to magnetic memories using anisotropic films and more particularly to thin magnetic film memories from which information is read out non-destructively.

Thin magnetic films have acquired growing importance in the past few years as elements for the construction of electronic computers and devices for data processing. Besides having a smaller volume, it was particularly the decrease in the energy required to switch the magnetization of the memory elements, and the shorter switching times, that have led to research in thin film elements and to their introduction into computer technology.

Thin magnetic films with uniaxial anisotropy of magnetization may be produced by various methods. Uniaxial anisotropy means that in the absence of external fields the magnetization throughout the film tends to orient itself in a preferred direction, which is often called the easy direction or the direction of the easy axis. The magnetization direction orthogonal to the easy axis in the film plane is called the hard direction. Uniaxial magnetic films exhibit a single easy direction of magnetization, which make possible two oppositely directed rest positions of the remanent flux. This property of thin film elements is used to store binary information in such a way that by definition the two opposite rest positions of magnetization are assigned the binary values 0 and 1.

The production, arrangement, and mode of operation of a thin magnetic film memory are described in commonly assigned U.S. patent application Ser. No. 217,768 filed Aug. 17, 1962, by W. Dietrich et al. now Patent No. 3,257,649. In a word-organized thin magnetic film memory, word drive amplifiers are used at the beginning of each memory operation to switch the magnetization of the memory cells associated with the word line concerned coherently into the hard direction. To write binary information into the memory cells of a selected word, bit drive amplifiers are used to generate, following the onset of the word drive pulse, magnetic field components acting in the direction of the easy axis. After the word drive pulse ceases, the rest position of magnetization in the preferred direction in the memory cells associated with the bit line is thus determined in accordance with the information to be written in.

To read out stored information, a word drive field is applied, and the polarity of the sense signal voltage induced in each bit-sense line when the magnetization is switched into the hard direction makes possible recognition of the rest position which the magnetization in the memory cells of the word had previously assumed. Such memory arrangements thus destroy during read-out the information previously stored.

So that all requirements can be fulfilled, memory arrangements should be compact in construction, should make possible a large storage capacity and short access times without elaborate technology, and should be capable of non-destructive read-out of information. To achieve high storage capacity, the individual memory element or memory cell must be very small; however, the smaller the memory cell, the smaller the sense signal that can be achieved. For this reason, the number of sense amplifier stages required in the output circuits is considerable. To produce sufficiently large sense signals, the word drive field should exceed the anisotropy field strength of the film element. Such driving fields cause, along with the field components acting in the direction of the easy axis, the unidirectional and coherent rotational switching of the magnetization simultaneously in all regions of the thin film elements. This switching process which is peculiar to thin films is considerably faster than so-called wall switching, in which one domain after another assumes the new magnetization state.

The word drive field causes complete rotation of the magnetization into the hard direction, i.e., in the direction 90° in relation to the direction of the easy axis. If nothing further occurs, the magnetization of the memory cells then splits into many single domains after such a word drive field ceases, of which a portion orient themselves in one possible rest position of the easy direction while the remainder assume the opposite rest position. The binary information value can then no longer be determined. It is therefore necessary that, after rotational switching of the magnetization of the memory cells into the hard direction, field components become active which throughout the entire film drive into a certain rest position the magnetization returning into the easy direction, so that the splitting up of the film into separate and oppositely magnetized domains is prevented.

To make possible non-destructive read-out, it has been suggested that a word drive field be used that does not deflect the magnetization of the thin film elements entirely into the hard direction, so that, after the word drive field ceases, the magnetization unequivocally returns to the rest position previously assumed. This can, for example, be achieved by using weaker word drive fields. The sense signals then obtained, however, have proved to be very weak. Another method attempts by means of drive lines not crossing each other orthogonally to deflect the magnetization only to an acute angle, so that unequivocal return into the rest position occurs. In this process, however, the advantage of rapid rotational switching of the magnetic films is lost. Another suggestion is to use the field linked with the eddy currents induced in adjacent electric conductors by the switching processes to act on the magnetization of the memory cells to provide non-destructive read-out. A magnetic memory employing the last-named method for non-destructive read-out is described in commonly assigned U.S. patent application Ser. No. 245,473, filed Dec. 18, 1962, by H. P. Louis et al. now Patent No. 3,304,543. The present invention concerns further improvements in thin magnetic film memories, in particular those allowing non-destructive read-out.

It is thus an object of the invention to provide an improved thin magnetic film memory.

It is a further object of the invention to provide an improved thin magnetic film memory with non-destructive read-out.

It is another object of the invention to provide an improved magnetic memory in which non-destructive read-out is achieved through the utilization of the inherent relaxation time of magnetic material adjacent to the memory cells.

The inventive magnetic memory, with memory cells including magnetic films having uniaxial anisotropy of magnetization for the storage of binary information in the form of the magnetization orientation of the individual films in one of the two preferred positions, i.e., 0 or 1, in the direction of the easy axis of magnetization, with drive lines, drive amplifiers, and selective switching means for subjecting the memory arrangement to currents or current pulses whose magnetic field is capable of acting on the magnetization of the memory cells, with sense lines, sense amplifiers, and selective switching means with whose aid the magnetic flux changes occurring in the individual films during interrogation can be read out, their induced voltage signals being rendered identifiable according to the information stored, is characterized by the fact that the magnetic film adjoin, on at least one side, magnetic material whose relaxation time with changes in magnetic state is of the order of the duration of the drive pulses for memory operation.

The inventive method for operating the magnetic memory with non-destructive read-out of stored binary information is characterized by the fact that the driving pulses, in the drive lines running in the direction of the easy axis, required for switching the magnetization of the associated films into the hard direction, in order that the voltages induced in the sense lines owing to the change in magnetic flux can appear as sense signals, are of such duration, or have such short decay times, that the magnetic induction still present in the magnetic material adjoining the magnetic films after the drive pulses have faded or terminated delivers magnetic field components causing rotation of the magnetization of the magnetic film into the easy direction originally assumed in accordance with the information just read-out, such that immediately after read-out the magnetization of the magnetic films switches back to the original position, i.e., 0 or 1, in the direction of the easy axis through coherent rotational switching.

The foregoing and other objects, features and advantages of the invention will be apparent from the following more particular description of a preferred embodiment of the invention, as illustrated in the accompanying drawings.

Figure 2:
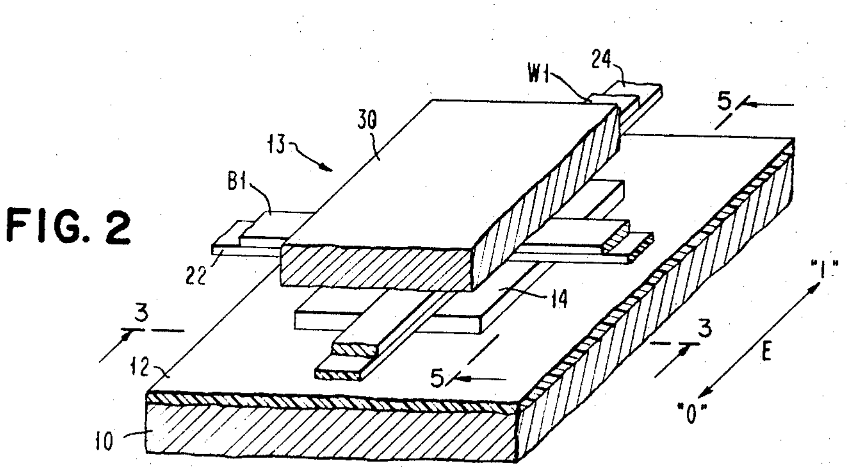
Figures 3, 4A, 4B, 5A, 5B, 6A, 6B:
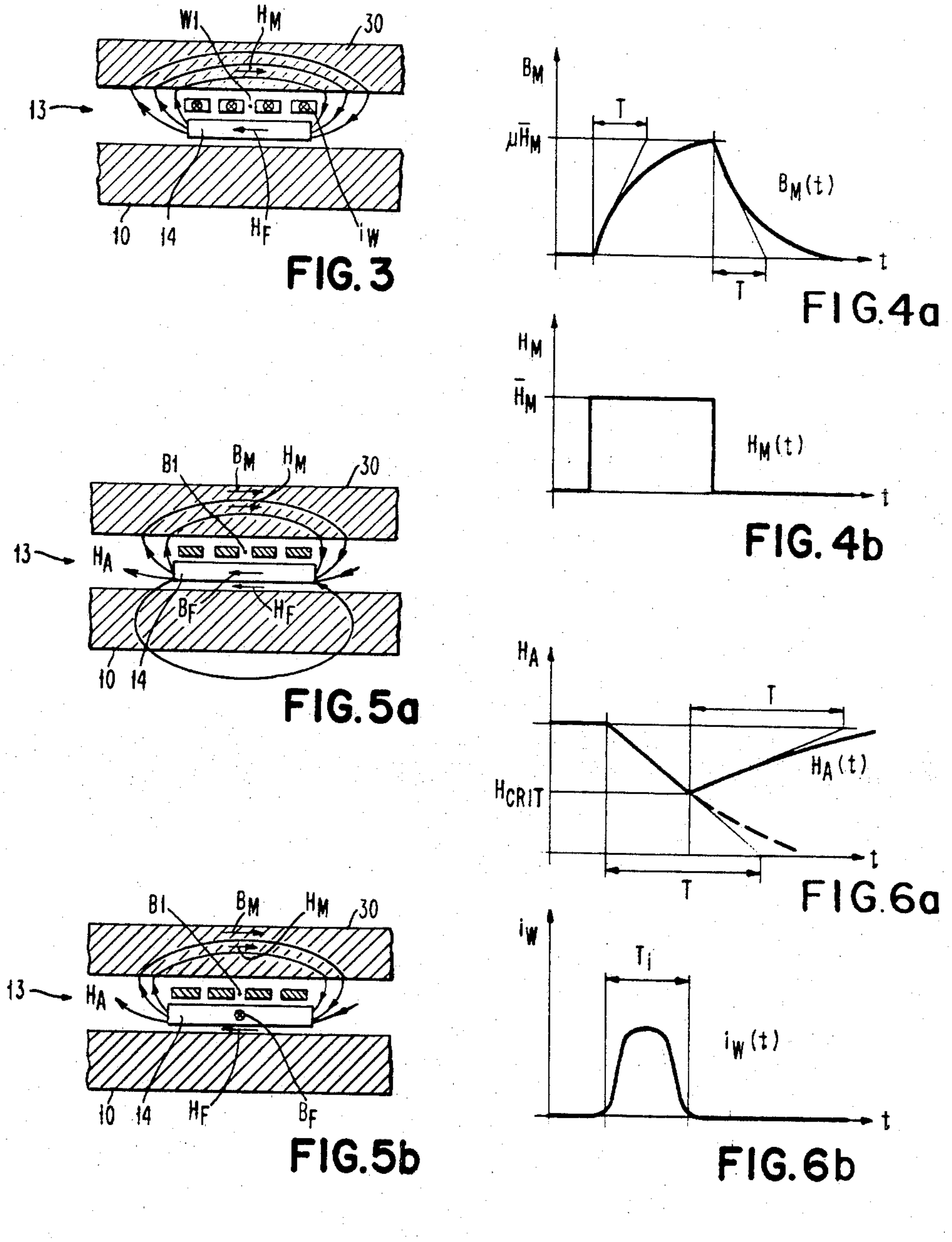

In the drawings:

FIG. 1 is a schematic representation of an embodiment of a thin magnetic film memory of the present invention, FIG. 2 is a perspective view, greatly enlarged, of part of the thin magnetic film memory of FIG. 1 illustrating only one memory cell, FIG. 3 is a sectional view of the memory cell of the invention taken along line 3—3 of FIG. 2 of the drawing illustrating the configuration of the word drive field shortly after magnetization reversal into the hard direction, FIGS. 4A and 4B show a plot of the induction versus time associated with an abrupt change of magnetic field within magnetic material, FIG. 5A is a sectional view of the memory cell of the invention taken along line 5—5 of FIG. 2 of the drawing illustrating the configuration of the static bit field when a binary information value is stored in the cell, FIG. 5B is a sectional view of the memory cell similar to that of FIG. 5A but illustrating the configuration of the bit field during non-destructive read-out at the moment when the magnetization of the cell is being switched into the hard direction, the outer bit field being essentially maintained owing to the finite relaxation time of the magnetic material, and FIGS. 6A and 6B indicate as a function of time the induction, associated with the bit field, in the magnetic material during non-destructive read-out, and the associated word drive pulse.

Referring to the drawings in more detail, FIG. 1 illustrates an embodiment of the magnetic memory of the present invention in a plan view the arrangement of memory cells, drive lines, and peripheral circuits of the memory, while FIG. 2 is a greatly enlarged perspective view of a section of the memory of FIG. 1 illustrating only one memory cell. An insulating layer 12 is mounted on a metal base plate 10 which carries a plurality of memory cells 13. These cells 13 includes uniaxially anisotropic thin magnetic films 14 and are arranged in a matrix of bit rows and word columns. The films 14 are produced from ferromagnetic material, e.g., an alloy of 80% nickel and 20% iron, and deposited onto the metal base plate 10 by one of the known processes, e.g., vapor deposition in a vacuum, cathode sputtering, chemical precipitation, or electrolytic deposition. During production the thin film 14 is exposed to a magnetic field which imparts to it the uniaxial anisotropy characteristic. An easy axis of the direction of the remanent magnetic flux is thus defined, indicated in FIGS. 1 and 2 by the double-headed arrow E. The magnetic films 14 may be of round, oval, square, or rectangular shape. The films 14 shown in the drawings as rectangular with the easy axis E running parallel to the longer sides. The length of each film 14 is, for example, approximately 0.5 to 1 mm., its width is approximately 0.3 mm., and its thickness is approximately 500–2000 Angstroms.

The matrix of the magnetic films 14 as arranged in rows and columns in FIG. 1 of the drawing can be produced by various means, for example, vapor deposition through a mask, the particles being deposited only at certain spots and in a particular arrangement through the openings in the mask, or the metal alloy can be deposited as a continuous layer by one of the above processes, the parts of the layer that are not required, i.e., the spaces between memory cells, being subsequently removed, for example, by a photo-etching process. The base plate 10 is made from an electrically conducting material such as silver with its surface carrying the insulating layer 12 which is well polished or smooth. Insulating layer 12 consists, e.g., of a thin layer of vapor-deposited silicon oxide which not only insulates base plate 10 from the films 14 but also provides the desirable smooth surface. Adhesion properties are also improved by such intermediate layers.

A number of horizontally disposed bit lines B1 through B5 are provided, each of them being coupled with all magnetic films 14 of a different row of the memory matrix. The bit lines extend at an angle to the direction of the easy axis E of the magnetic films 14. At one end, each bit line B is conductively connected to the base plate 10, the other end leading, via a device 18, which may be of the type described in IBM Technical Disclosure Bulletin, vol. 6, No. 6, pp. 58 and 59, November 1963, to an arrangement 16 comprising means for bit selection and bit drive amplifiers. Devices 18.1 through 18.5 in each bit line B1 through B5 include switching means which make it possible for each bit line to be used for both write-in and read-out of information. During write-in of information bit lines B are switched through to the bit drive amplifiers in arrangement 16. For read-out the bit drive amplifiers of arrangement 16 are disconnected and sense amplifiers comprised in devices 18 connected to the appropriate bit line B. Bit lines B may be produced by a vapor deposition process. They are electrically insulated from the films 14 by a thin layer 22, as shown in FIG. 2 of the drawing. The lines are preferably strip lines produced by one of the known processes. They may be slit so that each drive line consists of several long narrow strip lines connected in parallel.

A number of word lines W1 through W6, formed on an insulating layer 24 over the bit lines B, are arranged vertically in the memory matrix. These word lines too are preferably strip lines, produced by one of the known processes, for example, like the insulating layer 24, by vapor deposition using a mask. It is also possible to etch the pattern of the lines out of a continuous metal layer. This metal layer can be mounted on a surface of a thin insulating foil. Word lines W extend in the direction of the easy axis E of the films 14, orthogonally to bit lines B. Each word line W is coupled with the magnetic films 14 of a word arranged in a column of the memory matrix. One end of each word line W is conductively connected to the base plate 10, while the other end leads to a device 20 comprising means for word selection and word drive amplifiers. If desired, the one end of each of the bit lines B and each of the word lines W may be connected to the base plate 10 through an appropriate impedance. A control device 21 is connected both to arrangement 16 for bit selection and to arrangement 20 for word selection. It serves for time control of the pulse cycles necessary for the memory operations in accordance with the requirements of the computer.

Devices 18 are used to connect bit lines B with devices for bit addressing and with the bit drive amplifiers in device 16 during that part of the memory cycle that serves for information write-in and to the corresponding sense amplifiers during that part of the memory cycle that serves for information read-out. In this way bit lines B have the dual function of bit drive lines during write-in and sense lines during read-out. Devices 18 can be omitted if in the direction of the bit lines additional lines, coupled to sense amplifiers, are provided that are used only as sense lines. Lateral slits provided in the bit lines B serve for better penetration of the word drive field to the films 14 and for avoiding eddy currents in the lines.

A current pulse sent through a word line W switches the magnetization of the associated films 14 into the hard direction by means of its magnetic field. To perform this function adequately, word lines W must lie as precisely as possible in the direction of the easy axis of magnetization of the films 14. One is free to choose the direction of bit lines B but their arrangement orthogonal to the word lines has proved suitable. Since bit lines B may also be used as sense lines during read-out, this orthogonal arrangement leads to the best decoupling between the two line systems. It is the task of word lines W to switch the magnetization of the films 14 of the word selected into the hard direction, and that of bit lines B to deliver field components acting in the direction of the easy axis so that the magnetization, having been switched into the hard direction, can return into a predetermined rest position. The polarity of the bit drive pulses therefore depends upon the information to be stored. The drive fields supplied by the bit drive pulses are significantly weaker than the word drive fields. They can thus effectively act on the magnetization of only those films 14 that had been switched into the hard direction by a word drive field. The information contained in the films 14 of words not selected remains intact.

The usual operation cycle in a word-organized memory arrangement is the following. For write-in, the magnetization of all memory cells associated with the word line of a selected word is simultaneously switched into the hard direction by means of a drive pulse on the word line. Almost simultaneously but a little after the onset of the word pulse, the bit lines carry write pulses, polarized according to the binary information to be stored, whose field, after the word drive pulse has faded or has been terminated, delivers the repellent torques for unequivocal rotational switching of magnetization of the memory cells concerned into the predetermined rest position, i.e., 0 or 1. To read out the binary information stored in the memory cells of a word, a drive pulse in the word line is required that switches the magnetization of each memory cell of that word simultaneously into the hard direction. In each sense line associated with a binary position, a signal corresponding to the rest position previously assumed, i.e., 0 or 1, then occurs that can be read out as 0 or 1.

Generally, the stored information is destroyed during read-out, since in the absence of back-driving external fields the return of the magnetization of the memory cells into the rest position is not unequivocally determined. If desired, the read-out operation may be completed by switching the magnetization in all memory cells of the word read out into a common predetermined rest position, e.g., the 0-position, after the word drive pulse has faded. This requires a magnetic bias that can be delivered by the magnetic field of permanent magnets or electromagnets or of a current or current pulse in the bit lines. If, however, the information values of the word are to be retained in the memory, then the normal practice is to regenerate the memory by renewed writing in of the information just read out.

In accordance with the present invention, the magnetic induction in a layer of soft magnetic material 30, indicated in phantom over the magnetic films 14 in FIG. 1, is utilized as an energy store, since, owing to its relatively slower fading after the word drive field has ceased, it still maintains a magnetic field in the region of the films 14 that acts upon the magnetization of the films 14. The use of external field components raised by bit pulses can be supported, or, in the case of non-destructive read-out, even replaced, for regenerating the original information in this manner. The word drive pulses must, however, be sufficiently short, i.e., shorter than the relaxation time of the magnetic field in the region of the films 14 acting in the easy direction.

FIG. 3 is a sectional view, taken through line 3—3 of FIG. 2, of the memory cell 13 including the thin magnetic film 14 in the presence of a word drive current $i_w$. The direction of the easy axis of magnetization corresponds to the direction of the word current $i_w$, perpendicular to the plane of the drawing. For greater clarity, only the elements essential to the desired effect are shown. Insulation and fastening means that may be used, as well as additional strip lines, such as the bit line B1 disposed between the word line W1 and the film 14, actually necessary for operating the magnetic memory, are omitted from the drawing. The thin magnetic film 14 is shown over the conducting metal base plate 10. Above the film 14, extending in a direction perpendicular to the drawing, runs the word line W1 which is split into four parallel strip lines by lateral slits. Above the line W1 is the covering layer of soft magnetic material 30 which for the word drive fields acts as a yoke closing the magnetic circuit passing through the film 14. In this way necessary drive current is reduced, since for the useful field $H_F$ within the film 14 to act, the environment must also be magnetized. Unlike open flux construction of a magnetic memory, here only very small air gaps remain on the sides which become negligible. The relatively long path of the field $H_M$ outside the magnetic film 14 now runs mainly through magnetic material, i.e., in an environment of considerably higher permeability than that of air. The permeability of the magnetic layer 30 should be at least ten times higher.

Suitable magnetic material for layer 30 is, for example, ferrite. It may be used in the form of ferrite plates, or finely dispersed ferrite or ferrite powder may be imbedded in a suitable binding agent covering the arrangement of thin magnetic films 14 as a layer. Carbonylic iron or HF iron may also be used for this purpose, as may a vapor-deposited ferromagnetic layer. Since the material should be a soft magnetic one, the deposited thin magnetic films can be isotropic, i.e., they need exhibit no preferred direction as easy magnetization, but anisotropic magnetic films with the preferred direction parallel or orthogonal to the easy direction can also be used. Known magnetic materials exist that have an inherent relaxation time with a time constant of the order of 5 to 10 nanoseconds which can be readily used in this invention to deliver a virtual bit field to provide a high speed non-destructive read-out operation.

To illustrate this property, FIG. 4 shows as a function of time the induction $B_M(t)$ in the magnetic material as it occurs after an abrupt change in the associated magnetic field $H_M(t)$. It is assumed that magnetic field $H_M$ changes abruptly from zero value to a value $\overline{H}_M$ and shortly thereafter again assumes zero value. Induction $B_M$ can follow this rectangular pulse of magnetic field $H_M$ only at a lower rate of speed. The leading and trailing edges, ideally assumed to be vertical, of the pulse of the field $H_M$ are transformed, approximately in accordance with an exponential law, into decaying edges of the induction $B_M$ within the magnetic material following the step function. The time constant T, which is the same for rise and fall, is of the order of several nanoseconds.

In soft magnetic materials like a linear ferrite the permeability is frequency dependent. The cut-off frequency $f_c$ is inversely proportional to the initial permeability $\mu$ at very low frequencies. For all ferrites in the relation $f_c = K \cdot 1/\mu$ the constant K has a value of 4000 mc./sec. to 7000 mc./sec. as pointed out by R. Feldtkeller, "Theorie der Spulen and Uebertrager," 3 Auflage, Stuttgart, Germany, 1958, p. 19, and by J. Smit and H. P. J. Wijn, "Ferrites," Eindhoven, Netherlands, 1959, pp. 269 to 271. According to this cut-off frequency the relaxation time constant $\tau$ is $\tau = \frac{1}{2}\pi \cdot f_c$. The desired time constant of about 5 nanoseconds can therefore be obtained with a soft magnetic material having a cut-off frequency of $f_c = 30$ mc./sec. and a low frequency permeability of $\mu = 200$. Soft magnetic materials used up to now as so called keepers usually have smaller permeability and therefore so small relaxation time constants, that the described non-destructive read operation has not been detected so far.

FIG. 5A is a sectional view, taken through line 5—5 of FIG. 2, of the memory cell 13 illustrating a static field, i.e., the rest position of magnetization. The direction of the easy axis of magnetization corresponds to the direction of the arrows $B_F$ for the magnetic induction within the film 14, and $H_F$ for the associated magnetic field. The film 14 is on the metal base plate 10 and above it and perpendicular to the plane of the drawing extends the bit line B1 consisting of four strip lines. Above the bit line B1 is the soft magnetic material 30, the word line W1 not being shown for purposes of clarity. It can be seen from the field configuration illustrated in FIG. 5A that the field lines close essentially through the magnetic material 30, as is indicated by the arrows and the designations $H_M$ for the magnetic field in the magnetic material and $B_M$ for the induction. The field also penetrates into the metal base plate 10 but there it is considerably less dense. Field portion $H_A$ acts in the air gap. As is shown by the arrow $B_F$ pointing to the left in the film 14, the remanent magnetization of the thin film is in one of the two rest positions in the direction of the easy axis. Regular magnetic poles are formed at the ends of the magnetic film 14. The associated magnetic field lines close around the space in the manner shown. They penetrate the adjoining metal base plate 10 in a similar configuration as if the field were in air, since the permeability of the metals used is substantially the same as that of air. In the soft magnetic material 30, on the other hand, the field is significantly more concentrated owing to its higher permeability, as is shown by two field lines in close proximity.

In a view similar to FIG. 5A, FIG. 5B also shows the field configuration but at a point of time immediately after rotational magnetization switching of the film when the original magnetic field has been maintained in the magnetic layer 30 owing to the finite relaxation time of the magnetic material. The film 14 is again shown on metal base plate 10 and bit line B1 is shown as a slit strip line consisting of four parallel conductors. Other drive lines necessary for memory operation, as well as intermediate layers for insulation or for improving adhesion, are omitted from the drawing. Within the film 14 the symbolic representation of induction $B_F$ by arrow feathers through a diagonal cross indicates that the magnetization in the film 14 now points away from the observer and thus into the hard direction. In the outer space, magnetic field $H_F$, $H_A$ and $H_M$ as shown are still the same as before in the case of the static field since the induction $B_M$ in the magnetic material 30 has not yet disappeared and therefore tends to maintain the preceding field configuration. Although no magnetic poles could exist at the edges of the film 14, since the magnetization has just been switched into the hard direction by means of an external driving field, the field lines from magnetic material 30 still seek to close as before. This explains why the field lines $H_F$ that have been partly forced out of the film 14 tend to switch the magnetization back into the original rest position when the driving pulse loses its power to drive the magnetization of the film 14 into the hard direction within the proper time interval.

The required relationships are elucidated in FIGS. 6A and 6B which show, as a function of time during non-destructive read-out, the induction, associated with the bit field, or rather the magnetic field strength $H_A$ proportional to it, in the immediate vicinity of the film 14, as well as the associated word drive pulse $i_W$. Three stages can be distinguished. In the static stage, i.e., when a binary value is stored in the memory cell 13, induction $B_M$ in the soft magnetic material has a certain constant value. The magnetic field $H_A$ proportional to it in the vicinity of the film 14 is, thus, also constant. No word drive current $i_W$ flows during this stage. In the second stage, of duration $T_i$, the word drive field is active. As can be seen from FIG. 6B, the word drive pulse is nearly rectangular. During this stage the magnetic field $H_A$ decays exponentially with a time constant T, in a similar manner as described in connection with FIGS. 4A and 4B.

If one ensures, through a choice of a suitable magnetic material with a time constant of approximately twice the duration of a word drive pulse, that at the end of $T_i$, only a certain field $H_{crit}$ remains, then a non-destructive read-out operation is produced since the field $H_{crit}$ then delivers the necessary back-driving field components which, after the word drive field has ceased, allow the magnetization of the films 14 to return to their original position. The virtual bit field $H_{crit}$ utilized for non-destructive read-out must have about 0.3 to 0.5 the value of that bit field applied in the write-in or binary information when feeding bit pulses to the bit lies. In the third stage when the word drive field has faded or terminated, magnetic field $H_A$ in the vicinity of the film 14 again rises exponentially with a time constant T to its original constant value.

Although the soft magnetic layer 30 is shown in the drawings above the films 14, it should be understood that the layer 30 may be located below a conductive plate made similar to but preferably thinner than plate 10 and substituted therfor.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A non-destructive read-out memory device comprising a memory cell including a magnetic film having uniaxial anisotropy of magnetization and magnetic element magnetically coupled with said film, said magnetic element being made of magnetic material having a given magnetic relaxation time, means including a source of drive pulses each having a duration less than that of said given time for producing a magnetic field varying the magnetization of said film and means for detecting variations of magnetizations in said film.

2. A device as set forth in claim 1 wherein said magnetic field producing means includes a drive line arranged parallel to the direction of the uniaxial anisotropy of magnetization of said film.

3. A device as set forth in claim 1 wherein said magnetic element is made of soft magnetic material.

4. A device as set forth in claim 3 wherein said magnetic element is made of ferrite.

5. A device as set forth in claim 3 wherein said soft magnetic element has the form of a flat plate arranged parallel to said magnetic film.

6. A device as set forth in claim 3 wherein said plate includest finely dispersed ferrite arranged in a continuous binding material layer.

7. A device as set forth in claim 3 wherein said plate includes finely dispersed magnetic materials made of carbonylic iron arranged in a continuous binding material layer.

8. A device as set forth in claim 3 wherein said plate includes finely dispersed magnetic material made of HF iron arranged in a continuous binding material layer.

9. A device as set forth in claim 1 wherein said magnetic element has a permeability greater than ten.

10. A device as set forth in claim 9 wherein said given relaxation time has a time constant from 5 to 10 nanoseconds.

11. A device as set forth in claim 10 wherein said given relaxation time is approximately twice as long as the duration of said drive pulse.

12. A device as set forth in claim 11 further including means for applying a given bit field to said magnetic film in the direction of the uniaxial anisotropy of magnetization at the termination of said drive pulse to write new information into said memory cell, said given relaxation time having a value such that after the termination of said drive pulse the magnetic induction in said magnetic element produces at said film a vertical bit field having a value approximately 0.3 to 0.5 of said given bit field.

References Cited

UNITED STATES PATENTS

| | | | |
|---|---|---|---|
| 3,195,115 | 7/1965 | Bradley | 340—174 |
| 3,304,543 | 2/1967 | Louis et al. | 340—174 |

BERNARD KONICK, *Primary Examiner.*

J. F. BREIMAYER, *Assistant Examiner.*